(12) United States Patent
Lee et al.

(10) Patent No.: US 7,871,709 B2
(45) Date of Patent: Jan. 18, 2011

(54) MODIFIED TIE-LAYER COMPOSITIONS AND IMPROVED CLARITY MULTI-LAYER BARRIER FILMS PRODUCED THEREWITH

(75) Inventors: Chun D. Lee, Cincinnati, OH (US); Timothy S. Schloemer, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 1380 days.

(21) Appl. No.: 11/221,119

(22) Filed: Sep. 7, 2005

(65) Prior Publication Data

US 2007/0054142 A1   Mar. 8, 2007

(51) Int. Cl.
*B32B 27/32* (2006.01)
*B32B 27/18* (2006.01)

(52) U.S. Cl. .................. 428/515; 428/520; 428/522; 428/523; 524/284; 524/543

(58) Field of Classification Search ........................ None
See application file for complete search history.

(56) References Cited

U.S. PATENT DOCUMENTS

| | | | |
|---|---|---|---|
| 5,135,975 A | 8/1992 | Rekers | |
| 5,180,784 A * | 1/1993 | Ohmae et al. | 525/207 |
| 5,929,146 A | 7/1999 | Amos et al. | |
| 5,981,636 A | 11/1999 | Amos et al. | |
| 6,177,516 B1 | 1/2001 | Hudak | |
| 6,583,206 B2 * | 6/2003 | Zhao | 524/242 |
| 7,125,929 B2 | 10/2006 | Ward | |
| 2005/0038151 A1* | 2/2005 | Kochanowicz et al. | 524/264 |

FOREIGN PATENT DOCUMENTS

| | | |
|---|---|---|
| JP | 60085945 | 5/1985 |
| WO | WO 02/094759 A1 | 11/2002 |
| WO | WO 2004/106452 A1 | 12/2004 |
| WO | WO 2005/113697 A1 | 12/2005 |

OTHER PUBLICATIONS

U.S. Appl. No. 10/842,924, filed May 11, 2004, Ward, D.

* cited by examiner

*Primary Examiner*—Monique R Jackson
(74) *Attorney, Agent, or Firm*—Gerald A. Baracka; Jonathan L. Schuchardt

(57) ABSTRACT

Tie-layer adhesive compositions which are blends of modified and unmodified polyolefins and containing a saturated bicyclic modifier compound and multi-layer barrier films having improved clarity produced therewith are provided.

17 Claims, No Drawings

MODIFIED TIE-LAYER COMPOSITIONS AND IMPROVED CLARITY MULTI-LAYER BARRIER FILMS PRODUCED THEREWITH

BACKGROUND OF THE INVENTION

1. Field of the Invention

The invention relates to modified tie-layer adhesive compositions and to their use in coextruded multi-layer barrier films. The adhesive blends which area utilized as the tie-layer to adhere the barrier layer and polyolefin layer(s) are blends of a polyethylene resin, graft-modified, i.e., functionalized polyethylene and saturated bicyclic modifier compound.

2. Description of Prior Art

Multi-layer barrier films are widely used in the packaging industry primarily for food packaging applications where film clarity is an important consideration. Such applications include wraps for meat and cheese, formed bags and pouches including cook-in packaging. They are also used for packaging snack foods, cereals, baking mixes and the like.

Depending on the intended end-use application of the multi-layer barrier film, the number and arrangement of the resin layers and the types of resins employed will vary. Polyethylene (PE) resins are widely used based on their ability to provide essential properties such as structural integrity, puncture resistance, abrasion resistance, etc. Ethylene-vinyl alcohol (EVOH) copolymers and polyamides (PA) are widely used as a barrier layer to prevent the passage of oxygen and moisture.

To facilitate adhesion of the non-polar polyethylene layer(s) and polar barrier resin layer(s), adhesive layers referred to as tie-layers, are employed. Tie-layers are generally mixtures of functionalized polyolefins, i.e., polyolefins having polar functionality grafted onto the polymer backbone, and non-functionalized polyolefins. While various tie-resin compositions are available and known to effectively adhere PE to EVOH or PA this is often accompanied by an undesirable decrease in film clarity and/or grainy appearance—the latter often referred to as "orange peel." Even though the causes of these visual phenomena are not completely understood, the problems are generally believed to be the result of interfacial distortion caused by reaction of the functionality of the tie resin with the functional groups of the EVOH or nylon barrier resin. While the adhesive bond strength is directly proportional to the number of bonds formed at the tie-EVOH (or PA) interface, this same bonding effectively amplifies shear stresses caused by viscosity differences between the tie resin and barrier resin. The phenomena can be observed by coextruding linear low density polyethylene (LLDPE) and EVOH film and adding increasing amounts of grafted maleic anhydride (MAH) to the LLDPE. As the amount of the grafted MAH increases, there is a corresponding increase in adhesion and interfacial distortion, i.e., reduction in film clarity. This occurs even though the viscosity of the LLDPE does not significantly change as the grafted MAH is added. The degree of interfacial distortion is determined using Narrow Angle Light Scattering techniques (ASTM D1746-03).

Various techniques have been employed in an effort to improve clarity and eliminate or reduce orange peel in multi-layer barrier films while maintaining high adhesion between the film layers. One such approach is disclosed in copending application Ser. No. 10/842,924 which utilizes linear low density ethylene-α-olefin (LLDPE) copolymers having a network structure as the base resin for the tie-layer adhesive composition. Whereas it is possible to produce barrier films having improved clarity using the tie-layer composition of the invention, the compositions require the use of base resins which are more costly to produce than conventional PE base resins.

Accordingly, it would be highly advantageous if adhesive compositions produced using conventional PE base resins and having improved clarity in multi-layer constructions were available. It would be even more advantageous if this could be accomplished by the addition of small amounts of readily available modifying agents to existing PE-based tie-layer compositions. These and other advantages are achieved with the present invention.

Various fused ring compounds, e.g., disodium bicyclo[2.2.1]heptene dicarboxylate and N-carboxymethyl-bicyclo[2.2.2]oct-5-en-2,3-dicarboximide, are disclosed as nucleating agents primarily for propylene homopolymers and copolymers of propylene with ethylene, 1-butene, 1-hexene, 1-octene, 4-methyl-1-pentene, vinyl acetate and methyl acrylate in U.S. Pat. Nos. 5,929,146 and 5,981,636. Whereas the references disclose use of the nucleating agents for copolymers of ethylene and comonomers containing functional groups, such as acrylic acid, methyl and ethyl acrylate and vinyl acetate, there is no suggestion of their use with graft-modified polymer and particularly with tie-layer adhesive blends of polyethylene resins and graft-modified polyethylene resins. Moreover, the disclosed fused ring nucleating agents are utilized to enhance the properties of molded goods produced from the propylene polymers and there is no disclosure of their use for coextruded multi-layer films and, more particularly, in the tie-layer compositions used for the production of coextruded multi-layer films.

PCT application WO 02/094759 discloses saturated bicyclic compounds which are structurally similar to those disclosed in U.S. Pat. Nos. 5,981,636 and 5,929,146 as nucleating agents for polypropylene to provide high peak crystallization temperatures and other benefits. While the reference discloses that propylene polymer compositions containing the saturated bicyclic nucleating agents can be fabricated into films, the reference is totally silent with regard to their use in tie-layer adhesive compositions and for multi-layer barrier film applications.

SUMMARY

Improved tie-layer compositions comprised of modified and unmodified polyethylene resins and containing a saturated bicyclic modifier compound are provided. More specifically, the tie-layer adhesive compositions of the invention are adhesive blends comprising 70 to 99.5 weight percent polyethylene homopolymer or copolymer base resin and 0.5 to 30 weight percent modified polyolefin having ethylenically unsaturated carboxylic acid or acid derivative functionality grafted to the polymer backbone containing 100 to 20000 ppm saturated bicyclic dicarboxylate salt modifier wherein the rings share at least two non-adjacent carbon atoms. Bicyclic modifiers employed correspond to the structural formula

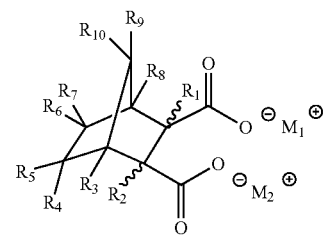

where $M_1$ and $M_2$ are metal cations and $R_1$, $R_2$, $R_3$, $R_4$, $R_5$, $R_6$, $R_7$, $R_8$, $R_9$, and $R_{10}$ are individually selected from the group consisting of hydrogen, $C_1$-$C_9$ alkyl, hydroxyl, $C_1$-$C_9$ alkoxy, $C_1$-$C_9$ alkyleneoxy, amine and $C_1$-$C_9$ alkylamine, halogen, phenyl, alkylphenyl and geminal or vicinal $C_1$-$C_9$ carbocyclic. Preferred bicyclic are those wherein the metal cation of the bicyclic modifier is selected from the group consisting of sodium, potassium, calcium, barium and strontium and $R_1$, $R_2$, $R_3$, $R_4$, $R_5$, $R_6$, $R_7$, $R_8$, $R_9$, and $R_{10}$ are hydrogen.

In a highly useful embodiment of the invention the base resin has a density from 0.89 to 0.935 g/cm³ and the modified polyolefin is an ethylene homopolymer or copolymer grafted with 0.5 to 3.0 weight percent maleic anhydride. It is even more preferred when the adhesive blend is comprised of 80 to 99 weight percent LLDPE copolymer of ethylene and butene-1, hexene-1 or octene-1 and 1 to 20 weight percent of a modified polyolefin which is maleic anhydride grafted HDPE or LLDPE.

High clarity multi-layer barrier films wherein the above-described tie-layer compositions are adhesively bonded to a barrier layer are also provided. Particularly advantageous are multi-layer film constructions wherein the barrier layer is EVOH or polyamide. The barrier films may have the tie-layer adhesively bonded to one or both sides of the barrier layer and may further comprise a polyolefin resin layer. With the latter constructions the tie-layer is disposed between the barrier and polyolefin layers.

DETAILED DESCRIPTION

The improved tie-layer compositions of the invention are comprised of adhesive blends of PE, graft-modified PE and bicyclic modifier. Compositions of the above types are particularly well suited for use as tie-layer adhesives for multi-layer barrier constructions having superior adhesion and appearance.

Tie-layer adhesives which are blends of a polyolefin base resin and a modified polyolefin are known. Most generally, the base resin is comprised of one or more polyolefins and the modified polyolefin is a polyolefin having ethylenically unsaturated carboxylic acid or acid derivative functionality grafted to the polymer backbone. The modified polyolefin is also referred to herein as the graft component. Grafting denotes covalent bonding of a graft monomer to the polymer chain.

For the adhesive blends modified in accordance with the invention, the base resin comprises 70 to 99.5 weight percent (wt. %) of the adhesive blend composition, i.e., combined weight of the base resin, graft component, modifier and any optional component(s) and, more preferably, 80 to 99 wt. % of the adhesive blend. Base resins employed are PE homopolymers and copolymers or mixtures and, more preferably, low density PE homopolymers and copolymers or mixtures with one or more other polyolefins. When the base resin is a mixture of low density PE and another polyolefin, the low density PE will be the major component of the base resin, i.e., comprise greater than 50 wt. % of the base resin. Low density PEs used will have a densities in the range 0.89 to 0.935 g/cm³ and, more preferably, from 0.90 to 0.925 g/cm³. In a highly useful embodiment of the invention, the low density PE is linear low density PE (LLDPE) obtained by the copolymerization of ethylene with butene-1, hexene-1 or octene-1. In an especially useful embodiment, the LLDPE base resin comprises 85 to 95 wt. % of the blend.

The base resin, whether comprised solely of low density polyethylene or a mixture with one or more other polyolefins will have a melt index (MI) from 0.01 to 20 g/10 min and, more preferably, from 0.5 to 10 g/10 min. MIs referred to herein are determined in accordance with ASTM D 1238-01, condition 190/2.16. Densities are determined in accordance with ASTM D 1505.

Other polyolefins which can be included with the low density PE to form the base resin include highly crystalline and elastomeric polyolefins. These include ethylene homopolymers; copolymers of ethylene with $C_{3-8}$ α-olefins, vinyl carboxylates and alkyl acrylates; terpolymers of ethylene and propylene with diene monomers; polyisobutylene; and copolymers of isobutylene and isoprene. Ethylene homopolymers and copolymers can include medium density polyethylene (MDPE); high density polyethylene (HDPE); very low density polyethylene (VLDPE); ultra low density polyethylene (ULDPE); ethylene-vinyl acetate (EVA) copolymers; ethylene-acrylate copolymers such as ethylene-ethyl acrylate and ethylene-n-butylacrylate copolymers; and mixtures thereof.

Polyolefins having elastomeric properties can include ethylene-vinyl acetate copolymers, ethylene-alkyl acrylate copolymers, and ethylene-α-olefin copolymers. These rubbery copolymers will generally have melt indexes from 0.1 to 100 g/10 min. and, more preferably, from 0.2 to 10 g/10 min. Densities will typically range from 0.850 to 0.980 g/cm². Ethylene-vinyl-acetate copolymers will generally contain from 8 wt. % to 60 wt. % vinyl acetate and, more preferably, from 10 wt. % to 50 wt. % vinyl acetate. Ethylene-alkyl acrylate copolymers will generally have from 1 wt. % to 50 wt. % and, more preferably, from 5 wt. % to 50 wt. % alkyl acrylate copolymerized. Ethylene-ethyl acrylate and ethylene-n-butyl acrylate copolymers are particularly useful elastomeric polymers of this type.

Ethylene-propylene rubber (EPR) and ethylene-propylene-diene rubber (EPDM) are highly useful elastomeric components for blending with the low density PEs to form the base resins of the invention. These elastomers typically contain greater than 50 wt. % ethylene. EPRs or EPDMs containing 60 wt. % or more ethylene are particularly advantageous. Elastomeric products of this type are obtained by conventional polymerization procedures known to the art and include the so-called metallocene rubbers. Illustrative elastomers of the above type obtainable from commercial sources include BUNA EPT 2070 (22 Mooney ML(1+4) 125° C., 69% ethylene), BUNA EPT 2370 (16 Mooney, 3% ethylene norbornene, 72% ethylene), BUNA 2460 (21 Mooney, 4% ethylene norbornene, 62% ethylene), NORDEL 3722P (Mooney 18, 71% ethylene; 0.5% ethylene norbornene), KELTAN EPDM DE244 (Mooney 55, 71% ethylene, 0.2% ethylene norbornene) and ENGAGE 8100 (23 Mooney (ML(1+4)121° C.) or ENGAGE 8200 with 8 Mooney.

Modified polyolefins combined with the above-described base resins and melt blended to obtain the adhesive blends modified in accordance with the invention are polyethylene resins and, more particularly, ethylene homopolymers and copolymers, grafted with an ethylenically unsaturated carboxylic acid or acid derivative. Mixtures of two or more modified ethylene polymers may be employed for preparation of the adhesive blends. Copolymers of ethylene and butene-1, hexene-1 or octene-1 obtained utilizing known polymerization processes, including metallocene and single-site polymerization processes and grafted with maleic anhydride, are most commonly used.

Grafting is accomplished in accordance with known procedures, generally by heating a mixture of the polyethylene resin and graft monomer(s) with or without a solvent. Most typically, the grafted products are prepared by melt blending the polyethylene in the substantial absence of solvent with the grafting monomer in a shear-imparting extruder/reactor. Twin screw extruders such as those marketed by Coperion (formerly Werner-Pfleiderer) under the designations ZSK-53, ZSK-83, ZSK-90 and ZSK-92 are especially useful for carrying out the grafting operation. A free radical generating catalyst, such as an organic peroxide, can be employed but is not necessary.

Carboxylic acids and carboxylic acid derivatives utilized as grafting monomers can include compounds such as acrylic acid, maleic acid, fumaric acid, citraconic acid, mesaconic acid, maleic anhydride, 4-methyl cyclohex-4-ene-1,2-dicarboxylic acid or anhydride, bicyclo(2.2.2)oct-5-ene-2,3-dicarboxylic acid or anhydride, bicyclo(2.2.1)hept-5-ene-2,3-dicarboxylic acid or anhydride, tetrahydrophthalic acid or anhydride, methylbicyclo(2.2.1)hept-5-ene-2,3-dicarboxylic acid or anhydride, and the like. Other derivatives which can be used to graft the polyethylene include dialkyl maleates, dialkyl fumarates, dialkyl itaconates, dialkyl mesaconates, dialkyl citraconates and alkyl crotonates. It may be desirable to use more than one grafting monomer to vary the physical properties of the modified polyolefin product. Maleic anhydride (MAH) is a particularly useful grafting monomer.

Modified PEs obtained by grafting ethylene-α-olefin copolymers having densities from 0.905 to 0.965 g/cm$^3$ and grafted with 0.5 to 3.0 wt. % ethylenically unsaturated carboxylic acid or acid derivative are particularly useful for preparation of the improved adhesive blend compositions of the invention. In one highly useful embodiment, the ethylene-α-olefin copolymer is an HDPE resin having a density from about 0.945 to 0.965 g/cm$^3$. In another highly useful embodiment, the ethylene-α-olefin copolymer is a LLDPE resin having a density from about 0.910 to 0.930 g/cm$^3$. The LLDPE may be the same type as used for the base resin. Particularly useful adhesive blends are obtained using HDPE and LLDPE resins grafted with 0.75 to 2.5 wt. % maleic anhydride. The MI of the grafted HDPE or LLDPE component will most generally be in the range from about 0.5 to about 20 g/10 min.

The graft-modified PE component constitutes from 0.5 up to about 30 wt. % of the adhesive blend. More preferably, an amount of graft-modified PE is blended with the base resin so that it comprises 1 to 20 wt. % of the adhesive blend. In an especially useful embodiment of the invention where the base resin is LLDPE, or predominantly LLDPE, the graft component comprises 5 to 15 wt. % of the blend and is maleic anhydride grafted HDPE or LLDPE.

To obtain the improved tie-layer adhesive compositions of the invention useful for the production of multi-layer barrier films having improved appearance, 100 to 20000 ppm bicyclic modifier is added to the adhesive blend, i.e., the combination of base resin and graft-modified PE. The amount of modifier in the adhesive blend is more preferably from 200 to 10000 ppm and, most preferably, from 500 to 5000 ppm.

Bicyclic modifiers employed for the invention are saturated bicyclic dicarboxylate salts. More specifically, the modifiers contain two rings wherein the rings share at least two nonadjacent carbon atoms and conform to the structural formula

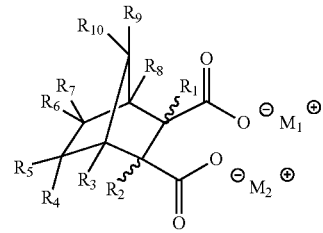

wherein $M_1$ and $M_2$ are the same or different and are independently selected from the group consisting of metal cations and $R_1$, $R_2$, $R_3$, $R_4$, $R_5$, $R_6$, $R_7$, $R_8$, $R_6$, and $R_{10}$ are individually selected from the group consisting of hydrogen, $C_1$-$C_9$ alkyl, hydroxyl, $C_1$-$C_9$ alkoxy, $C_1$-$C_9$ alkyleneoxy, amine and $C_1$-$C_9$ alkylamine, halogen, phenyl, alkylphenyl and geminal or vicinal $C_1$-$C_9$ carbocyclic. The metal cations are preferably sodium, potassium, calcium, barium and strontium and $R_1$, $R_2$, $R_3$, $R_4$, $R_5$, $R_6$, $R_7$, $R_8$, $R_9$, and $R_{10}$ are preferably hydrogen. $M_1$ and $M_2$ may be a single divalent metal cation, e.g., calcium, strontium or barium.

Representative and highly useful dicarboxylate salts of the above types include disodium bicyclo[2.2.1]heptane-2,3-dicarboxylate and calcium bicyclo[2.2.1]heptane-2,3-dicarboxylate. Compounds of the above types are commercially available and disclosed in U.S. Pat. No. 5,135,975 which is incorporated herein by reference.

The improved, modified tie-layer compositions are prepared by melt blending the base resin(s), modified PE and bicyclic modifier by conventional means. They will typically have a melt index from 0.1 to 10 g/10 min and, more preferably, from 0.3 to 5 g/10 min. Mixing in a Banbury mixer or twin-screw compounding extruder is especially convenient. Blends produced in this manner can be pelletized and stored for subsequent use or the melt blends may be directly extruded or coextruded.

All of the components of the adhesive blend can be dry blended and melt blended or separate feeds of the blend components can be fed to the extruder mixer used for melt blending. In this latter procedure the modifier will typically be utilized as a masterbatch, i.e., combined with one or more polyolefins (which may be the same or different than the PE used for the base resin and/or graft component). Stabilizers and other additives employed at low levels could also be included in the masterbatch. Masterbatch techniques are known and advantageously utilized to facilitate the addition of additives and insures uniform distribution of the additives with minimal processing.

Adhesive blends produced in accordance with the invention are useful as general purpose tie resins and may be used to bond a variety of substrates. For example, they can be used to bond plastic materials, wood, glass, paper, composite materials, metals and the like to similar or dissimilar substrates.

The modified adhesive blends of the invention can be fabricated by conventional means, e.g., blown film extrusion, cast film extrusion, etc., into monolayer films which can subsequently be used to laminate various substrates. Most typically, however, the adhesive blends are coextruded with other polymers, primarily polyolefins and polymers having barrier properties, to form multi-layer constructions.

The improved modified adhesive blends of the invention are, however, particularly useful tie-layers for multi-layer barrier films where they provide films having good adhesion and improved appearance, namely, reduced haze and orange peel. With the adhesive compositions of the present invention, it is possible to significantly reduce interfacial clarity distortion in multi-layer coextruded barrier film constructions. Furthermore, this can be accomplished with little or no reduction in adhesion.

Interfacial clarity distortion is a significant problem for processors when coextruding different resins. When two molten polymers of different viscosities meet in a manifold die the viscosity mismatch causes shear stress at the interface between the two polymers. If this interfacial shear stress reaches a critical level, the interface can become uneven and give the resulting film a distorted appearance, commonly referred to within the industry as "grainy" or "orange peel." The problem is exacerbated when polymers, such as barrier and tie-resins, capable of reacting at their interface are coextruded. While the film processor can minimize the effect, e.g., by varying processing conditions or choosing polymers which have more closely matched viscosities under the processing conditions, all of these approaches can negatively impact the economics and/or other aspects of the process. In addition to possibly requiring the use of more costly raw materials and/or limiting the production rate, such changes can also adversely affect adhesion and other critical film properties. The tie-layer adhesives of the present invention provide a viable and practical alternative means of reducing interfacial clarity distortion at the tie resin/barrier resin interface.

In barrier film applications, the adhesive compositions serve as tie-layers between layers of dissimilar resins which cannot be effectively bonded directly, i.e., the barrier resin and the polyolefin. The same or different polyolefin can comprise one or more layers of the multi-layer construction with one or more layers of the same or different barrier resin. Polyolefins typically employed for such multi-layer coextrusions include LDPE, LLDPE, HDPE, EVA, ethylene-acrylic acid copolymers, ethylene-methacrylic acid copolymers, ethylene-acrylic acid ester copolymers, ethylene-methacrylic acid ester copolymers, ionomers and the like.

Barrier resins used are typically an EVOH resin or PA resin. Any of the known EVOH and PA resins noted for their barrier properties can be used. For example, in the case of polyamides it could be NYLON 6, NYLON 6,6, NYLON 6/6,6 or blends of these NYLONS with amorphous NYLON.

Multi-layer barrier films are widely used for food packaging applications and in most of these applications good film clarity is an important consideration. Food packaging applications include formed bags, pouches, casings, etc., for packaging meat and poultry products. They can also be used for snack foods, cereals, baking mixes, and the like. They may also have utility for cook-in packaging.

Numerous multi-layer barrier film constructions designed to meet the clarity and other requirements of various packaging applications are possible using the improved, modified tie-layer adhesive compositions of the invention. Illustrative multi-layer constructions include the following where "Tie" represents the adhesive compositions of the invention and "FCL" represents a food contact layer such as LDPE, LLDPE, EVA, ethylene-acrylic acid or ester copolymer, ethylene-methacrylic acid or ester copolymer, ionomers or the like:
  LDPE/Tie/NYLON/Tie/FCL
  LDPE/Tie/EVOH/Tie/FCL
  LLDPE/Tie/EVOH/Tie/FCL
  LLDPE/Tie/NYLON/Tie/FCL
  HDPE/Tie/EVOH/Tie/FCL
  HDPE/Tie/NYLON/Tie/FCL Some commonly used sealable film constructions include:
  LLDPE/Tie/EVOH/Tie/Sealant
  HDPE/Tie/NYLON/Tie/Sealant
  HDPE/Tie/EVOH/Tie/Sealant
where the sealant layer is EVA, LLDPE or ionomer.

All of the above constructions wherein a barrier resin is bonded to a layer of dissimilar resin will benefit from the use of the adhesive blends of the invention as the tie-layer. It will, however, be understood by those skilled in the art that, as far as clarity considerations are concerned, the clarity of the film can be no better than the clarity of the least clear film resin used. For example, HDPE is recognized to have poorer clarity than LLDPE and when it is used as one of the layers in a multi-layer construction, it will limit the clarity of the overall construction.

The following examples illustrate the invention; however, those skilled in the art will recognize numerous variations which are within the spirit of the invention and scope of the claims. Adhesive tie-layer blend compositions utilized in the examples were pelletized prior to use. This was accomplished by dry blending all of the components and then melt blending the mixture in a Warner-Pfleiderer twin screw extruder equipped with a multi-hole (⅛ inch diameter) die connected to a strand cutter. The extruder screw speed was 150 rpm. Temperature conditions were 200° C. in the metering zone and 210° C. at the die.

To evaluate clarity and adhesion of the tie-layer compositions, 3 mil and 5 mil multilayer cast films were prepared. The five-layer coextruded films had an A/B/C/B/A layer structure where B represents the tie-layer composition, C represents the barrier layer and A represents the polyolefin layer. The films were produced on a Killion laboratory scale film line using three 1 inch extruders in an A/B/C/B/A feedblock configuration. Films were extruded using a 10 inch flat die to produce continuous 8 inch wide film samples.

Example 1

Three and 5 mil multilayer barrier films were prepared using HDPE (MI 0.95 g/10 min; density 0.958 g/cm$^3$) as the outside polyolefin layers (A) and a commercial EVOH copolymer (SOARNOL™ DC3203F) as the barrier layer (C). The modified adhesive blend used for the tie-layers (B) was comprised of 95.9 wt. % LLDPE (MI 1.0 g/10 min; density 0.917 g/cm$^3$), 4 wt. % HDPE grafted with 1.65 wt. % maleic anhydride and having a MI of 12.5 g/10 min, and 0.1 wt. % disodium salt of cis-endo-bicyclo[2.2.1]heptane-2,3-dicarboxylic acid modifier.

Temperatures in the three heating zones and at the die for each of the three extruders used to coextrude the 5-layer films were as follows:

| HDPE | 360° F./390° F./400° F./410° F. |
| EVOH | 380° F./380° F./390° F./410° F. |
| Tie-Layer | 350° F./380° F./400° F./435° F. |

Weight percentages of each component in the 5-layer coextruded constructions were:

| 42% HDPE | 4% Tie | 8% EVOH | 4% Tie | 42% HDPE |
| --- | --- | --- | --- | --- |

Adhesion was determined in accordance with ASTM D 1876-93. The 3 and 5 mil films obtained using the modified tie-layer composition of the invention had adhesion values of 0.64 and 1.15 lb/in, respectively. This compares favorably with adhesion values obtained using tie-layer adhesive which did not contain the bicyclic modifier. Three and 5 mil films prepared using the unmodified tie-layer adhesive blend had adhesion values of 0.79 and 1.41 lb/in, respectively.

Improved film clarity was demonstrated by measuring narrow angle scattering (NAS) in accordance with ASTM D 1746 on the 5 mil films. Film obtained using the unmodified adhesive blend had an NAS value of only 12.4 whereas the NAS value obtained with the 5 mil film prepared using the modified tie-layer of the invention was 30.1. This represents over 140% improvement in film clarity using the modified tie-layer adhesives of the invention.

Example 2

To further demonstrate the improved clarity achieved with barrier films obtained using the modified tie-layer adhesives of the invention, 5-layer 5 mil constructions were prepared using EVA (MI 2 g/10 min; VA content 18 wt. %) for the outer layers (A). The EVOH barrier layer (C) was the same as in Example 1. The modified tie-layers used for (B) contained 91.27 wt. % LLDPE (MI 1.0 g/10 min; density 0.917 g/cm$^3$), 8.73 wt. % HDPE (MI 9.5 g/10 min; density 0.950 g/cm$^3$) grafted with 1.95 wt. % maleic anhydride, 1000 ppm disodium salt of cis-endo-bicyclo[2.2.1]heptane-2,3-dicarboxylic acid, and 2000 ppm of a stabilizer combination consisting of a 50/50 mixture of IRGANOX 1010 and IRGAFOS 168. The multi-layer film constructions were comprised as follow:

| 36% EVA | 7% Tie | 14% EVOH | 7% Tie | 36% EVA |
|---|---|---|---|---|

Extruder temperature profiles used to produce the multi-layer films were as follow:

| EVA | 325° F./350° F./380° F./380° F. |
|---|---|
| EVOH | 380° F./380° F./400° F./435° F. |
| Tie-Layer | 350° F./390° F./400° F./435° F. |

The NAS value obtained for the 5-layer film prepared using the modified tie-layer adhesive of the invention was 21.1, a 60% improvement over the value (13.2) obtained for an identically prepared 5-layer film wherein the tie-layer contained no bicyclic modifier. These five-layer constructions could not be meaningfully evaluated for adhesion since the adhesive strength achieved between the layers was greater than the cohesive strength of the EVA resin.

Example 3

Three and 5 mil films wherein polyolefin layers (A) were HDPE (MI 0.95 g/10 min; density 0.958 g/cm$^3$) and the barrier layer (C) was a commercial EVOH copolymer (SOARNOL™ DC 3203F) were prepared using the modified tie-layer adhesive of Example 2.

Temperatures employed for coextrusion in the three heating zones and at the die for each of the three extruders and the weight percentage of component in the resulting 5-layer coextruded constructions were the same as in Example 1.

Three and 5 mil films obtained using the modified tie-layer composition of the invention had adhesion values of 1.46 and 2.94 lb/in, respectively. This compares favorably with adhesion values obtained for identical film constructions prepared using the unmodified tie-layer adhesive, i.e., which did not contain the bicyclic modifier. Three and 5 mil films prepared using the unmodified tie-layer adhesive blend had adhesion values of 1.48 and 2.29 lb/in, respectively. The data demonstrates that the addition of the bicyclic modifier to the tie-layer composition does not significantly change adhesion of the polyolefin and barrier resin layers with the 3 mil films and, in fact, improves adhesion with the 5 mil films.

Example 4

Five-layer barrier films were prepared in accordance with the procedure of Example 1. The modified adhesive blend used as the tie-layer was comprised of approximately 85 wt. % LLDPE, 11 wt. % HDPE grafted with 1.95 wt. % maleic anhydride and 4 wt. % EPR rubber. The modified adhesive blend also contained 1000 ppm disodium salt of cis-endo-bicyclo[2.2.1]heptane-2,3-dicarboxylic acid modifier and 750 ppm stabilizer (IRGANOX 1076). Five-layer films were also obtained using a comparative tie-layer adhesive which contained no modifier compound. Whereas adhesion values of the multi-layer films obtained using the tie-layer adhesive blend of the invention and the comparative tie-layer adhesive blend were identical, 3.5 lb/in, the films prepared using the modified tie-layer adhesives of the invention had significantly improved clarity. The NAS value of film produced using the modified tie-layer adhesive of the invention was 23.7 whereas the NAS value of identically prepared film obtained using the unmodified comparative tie-layer adhesive was only 10.6.

We claim:

1. A tie-layer adhesive composition comprising:
   (a) an adhesive blend comprising 70 to 99.5 weight percent polyethylene homopolymer or copolymer base resin and 0.5 to 30 weight percent modified polyolefin having ethylenically unsaturated carboxylic acid or acid derivative functionality grafted to the polymer backbone; and
   (b) 100 to 20000 ppm saturated bicyclic dicarboxylate salt modifier wherein the rings share at least two non-adjacent carbon atoms.

2. The composition of claim 1 wherein the bicyclic modifier has the formula

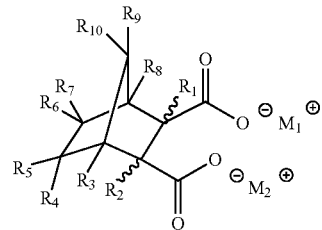

where $M_1$ and $M_2$ are metal cations and $R_1$, $R_2$, $R_3$, $R_4$, $R_5$, $R_6$, $R_7$, $R_8$, $R_9$, and $R_{10}$ are individually selected from the group consisting of hydrogen, $C_1$-$C_9$ alkyl, hydroxyl, $C_1$-$C_9$ alkoxy, $C_1$-$C_9$ alkyleneoxy, amine and $C_1$-$C_9$ alkylamine, halogen, phenyl, alkylphenyl and geminal or vicinal $C_1$-$C_9$ carbocyclic.

3. The composition of claim 2 wherein the base resin has a density from 0.89 to 0.935 g/cm$^3$ and the modified polyolefin is an ethylene homopolymer or copolymer grafted with 0.5 to 3.0 weight percent maleic anhydride.

4. The composition of claim 2 wherein the metal cation of the bicyclic modifier is selected from the group consisting of sodium, potassium, calcium, barium and strontium and $R_1$, $R_2$, $R_3$, $R_4$, $R_5$, $R_6$, $R_7$, $R_8$, $R_9$, and $R_{10}$ are hydrogen.

5. The composition of claim 3 wherein the adhesive blend contains 80 to 99 weight percent base resin and 1 to 20 weight percent modified polyolefin.

6. The composition of claim 5 wherein the base resin comprises an LLDPE copolymer of ethylene and butene-1, hexene-1 or octene-1 and the modified polyolefin is maleic anhydride grafted HDPE or LLDPE.

7. The composition of claim 5 which contains 200 to 10000 ppm bicyclic modifier.

8. The composition of claim 6 wherein the LLDPE has a density from 0.90 to 0.925 g/cm$^3$ and melt index from 0.01 to 20 g/10 min and the modified polyolefin is grafted with 0.75 to 2.5 weight percent maleic anhydride and has a melt index from 0.5 to 20 g/10 min.

9. The composition of claim 8 wherein the adhesive blend contains 85 to 95 weight percent base resin and 5 to 15 weight percent modified polyolefin and the bicyclic modifier is present in an amount from 500 to 5000 ppm.

10. A coextruded multi-layer barrier film comprising a barrier resin layer and tie-layer adhesively bonded thereto, said tie-layer comprising an adhesive blend comprising 70 to 99.5 weight percent polyethylene homopolymer or copolymer base resin and 0.5 to 30 weight percent modified polyolefin having ethylenically unsaturated carboxylic acid or acid derivative functionality grafted to the polymer backbone and 100 to 20000 ppm saturated bicyclic dicarboxylate salt modifier wherein the rings share at least two non-adjacent carbon atoms.

11. The barrier film of claim 10 wherein the bicyclic modifier has the formula

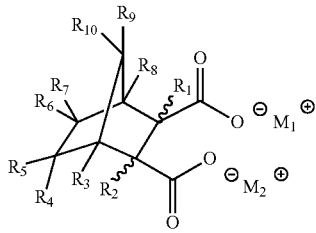

where $M_1$ and $M_2$ are metal cations selected from the group consisting of sodium, potassium, calcium, barium and strontium and $R_1$, $R_2$, $R_3$, $R_4$, $R_5$, $R_6$, $R_7$, $R_8$, $R_9$, and $R_{10}$ are hydrogen.

12. The barrier film of claim 11 wherein the tie-layer adhesive has a melt index from 0.1 to 10 g/10 min and is comprised of an adhesive blend containing 85 to 95 weight percent LLDPE copolymer and 5 to 15 weight percent HDPE or LLDPE grafted with 0.75 to 2.5 weight percent maleic anhydride and 200 to 10000 ppm bicyclic modifier.

13. The barrier film of claim 11 wherein the barrier resin is selected from the group consisting of ethylene-vinyl alcohol copolymers and polyamides.

14. The barrier film of claim 13 comprising a further polyolefin resin layer wherein the polyolefin resin is selected from the group consisting of LDPE, LLDPE, HDPE, EVA, ethylene-acrylic acid copolymers, ethylene-methacrylic acid copolymers, ethylene-acrylic acid ester copolymers, ethylene-methacrylic acid ester copolymers and ionomers and wherein the tie-layer is disposed between said polyolefin layer and the barrier resin layer.

15. The barrier film of claim 13 having tie-layers adhesively bonded to both sides of the barrier resin layer.

16. The barrier film of claim 15 further comprising polyolefin resin layers and wherein the tie-layers are disposed between said polyolefin layers and the barrier layer.

17. The barrier film of claim 16 wherein the polyolefin resin is selected from the group consisting of LDPE, LLDPE, HDPE, EVA, ethylene-acrylic acid copolymers, ethylene-methacrylic acid copolymers, ethylene-acrylic acid ester copolymers, ethylene-methacrylic acid ester copolymers and ionomers.

* * * * *